United States Patent [19]

McIlroy et al.

[11] Patent Number: 4,984,272

[45] Date of Patent: Jan. 8, 1991

[54] SECURE FILE HANDLING IN A COMPUTER OPERATING SYSTEM

[75] Inventors: M. Douglas McIlroy, Bernardsville; James A. Reeds, New Providence, both of N.J.

[73] Assignee: AT&T Bell Laboratories, Murray Hill, N.J.

[21] Appl. No.: 277,630

[22] Filed: Nov. 30, 1988

[51] Int. Cl.$^5$ .............................................. H04L 9/00
[52] U.S. Cl. ...................................... 380/25; 380/49; 364/222.5
[58] Field of Search .................... 380/25, 89; 364/200, 364/900

[56] References Cited

U.S. PATENT DOCUMENTS

| | | | |
|---|---|---|---|
| 4,858,117 | 8/1989 | DiChiara et al. | 364/200 |
| 4,864,616 | 9/1989 | Pond et al. | 380/25 |
| 4,885,789 | 12/1989 | Burger et al. | 380/25 |
| 4,918,653 | 4/1990 | Johri et al. | 364/900 |
| 4,926,476 | 5/1990 | Covey | 380/49 |

OTHER PUBLICATIONS

Cryptography and Data Security, D. Denning, Addison-Wesley, 1982, Chapter 4, pp. 191–258, 287.

*Primary Examiner*—Salvatore Cangialosi
*Attorney, Agent, or Firm*—Jerry W. Herndon; Gordon E. Nelson

[57] ABSTRACT

A method for administering secure access to files of a computer system. For a process-file pair, a first security label associated with the process is compared with a second security label associated with the file in response to a request to read or write the file. If the security label of the destination (file or process) of the read or write operation does not dominate the security label of the source (file or process), the security label of the destination is dynamically raised accordingly. If the security label of the file or process is raised, an indicator associated with this process and with this file is set to a first state representing that the file is safe for this process-file pair. Indicators associated with every other process linked with this file are set to a second state representing that the file is unsafe for those process-file pairs. The steps of testing the security labels of a file and a process on a read or write operation are omitted when the indicator associated with the process-pair is set to the safe state.

The security labels of certain files are assigned a frozen status. These security labels of such files cannot be altered in response to attempted read or write operations. Therefore, an attempt to wire a file having frozen status is denied when the security label of the writing process dominates that of the file. This mechanism is used to guarantee that files cannot be written to media external to the system, such as terminals, disk drives, tape drives and the like, unless the security label of the external media clears the media for access to the file.

13 Claims, 3 Drawing Sheets

SECURE FILE HANDLING IN A COMPUTER OPERATING SYSTEM

FIELD OF THE INVENTION

The invention relates to the field of security in computer systems generally and, in particular, to the control of secure access to files in a computer system by authorized users.

TECHNICAL BACKGROUND

Computer security is becoming an increasingly important and urgent issue. As witness to this, consider the present day concern over computer viruses which, if introduced into computer systems, have the ability to read and/or destroy unprotected data. Indeed, a number of such virus attacks have recently received nationwide attention.

Computer security is an encompassing term. It includes many aspects of protecting a computer or computer system. Security issues include system access by unauthorized users or programs and limitation of file access to limited users or groups of users. We are concerned here primarily with the control of access to files. A standard technique of protecting access to files is by means of permissions. In the commercial versions of the UNIX (Registered trademark of AT&T) operating system, for example, every file is associated with a set of READ and WRITE permission bits. In fact, there are three sets of such permission bits for each file, one set for the owner of a file, one set for members of a group associated with the file, and a final set for all other users of the system. A file owner controls the states of these permission bits. Thus, a file owner may prevent others from reading or writing a file by setting the READ, WRITE bits for group members and for all other system users to an unallowed state. Conversely, the file owner might allow all system users total access to a file by setting the READ and WRITE bits associated with all users.

The file permission technique works well in any system in which the users are sensitive to security issues and diligently administer the permission bits over which they have control. However, all system users are not always diligent. As such, the permission bit scheme represents a potential weak link in overall system security. A further disadvantage of the permission scheme is that it is necessarily limited in its flexibility. Some systems require many levels of defined security classifications for users and files alike. Military systems are good examples of such systems, in which files may range in levels from unclassified to top secret and be further partitioned in compartments to which the level may apply. Access to such files must be limited to users having appropriate security clearances and the security classifications must follow the files as they move in a system. In such label systems, both files and user processes are assigned security labels. A user process cannot read a file unless the process security label dominates that of the file. By dominate, it is meant that the security label of the process is sufficient to allow access to the file in accordance with the file security label. Similarly, a process cannot write a file unless the label of the file is at least as high as that of the process.

File access control, including the above permission and labeling methods, are discussed in CRYPTOGRAPHY AND DATA SECURITY, D. Denning, Addison-Wesley, 1982, Chapter 4, pp. 191-258. Also discussed at page 287 of the book is a method commonly referred to as dynamic security labels. In the dynamic security label method, the security labels of files and processes are raised as necessary to allow processes to access files. With such dynamic label methods, some additional form of protection must also be used to prevent ultimate unauthorized leakage of data to destinations external to the system. The dynamic security label method has advantages over fixed label types of methods. Fixed label methods tend to suffocate system users and may in severe cases render flexible and productive use of a system almost impossible. Dynamic labels provide reasonable levels of security while mitigating this suffocating tendency of fixed labels. However, the dynamic security label method has never been commonly used for two reasons. First, it is known that the technique introduces covert channels through which security breaches may occur. This, however, is not a serious problem. The new covert channels are generally limited in bandwidth to approximately one bit of information per system call. Thus, attempts to "smuggle" significant amounts of information through such a covert channel is detectable by relatively simple means. Additionally, to use such a channel, the user must already be cleared to use the data. Second, and more important, the verification of process and file security labels on every read and write operation adds a tremendous amount of overhead to routine system operations. Thus, it is desirable to find ways of reducing this overhead to acceptable levels, thereby allowing advantageous use of the dynamic security label method.

SUMMARY OF THE INVENTION

The invention is a method of administering secure access to files of a computer system. First and second security labels are associated with files and processes, respectively. For a given process-file pair, the first security label is compared with the second security label in response to an attempt by the process to read (or write) thea file. If the security label of the destination file or process of the read (or write) operation does not dominate the security label of the source file or process, the security label of the destination is dynamically raised sufficiently to dominate the security label of the source. The source and destination of a read operation, for example, are a file and a process, respectively. An indicator associated with this process and with this file is set to a first state representing that the file is safe for this process-file pair after the comparison of process and file security labels. Indicators associated with every other process presently capable of accessing this file are set to a second state representing that the file is unsafe for those process-file pairs. The steps of testing the security labels of a file and a process on a read (or write) operation are omitted when the indicator associated with the process-pair is set to the safe state.

The security labels of certain files are assigned a frozen status. The security labels of such files cannot be altered in response to attempted read or write operations. Therefore, an attempt to write a file having frozen status is denied when the security label of the writing process dominates that of the file. This mechanism is used to guarantee that data cannot be written to media external to the system, such as terminals, disk drives, tape drives and the like, unless the security label of the external medium clears the medium for access to the data.

In a preferred embodiment, the safe/unsafe indicator for each process-file pair actually comprises two indicators, a SAFE-TO-READ indicator and a SAFE-TO-WRITE indicator. For a given process-file pair, the SAFE-TO-READ indicator associated with the pair is set to a safe state on a request to read the file by the process if the security label of the process is found to dominate the security label of the file or if the security label of the process is raised as a result of the read. Similarly, the SAFE-TO-WRITE indicator associated with the pair is set to a safe state on a request to write the file if the label of the file dominates or is raised. All SAFE-TO-READ indicators for all other processes associated with the file are set to an unsafe state on a request to write the file when file label is raised and all SAFE-TO-WRITE indicators for all other files associated with the process are set to an unsafe state on a request to read the file when the process label is raised.

DETAILED DESCRIPTION

The dynamic security label method described herein has been implemented in a research version of the UNIX operating system (UNIX is a registered trademark of AT&T). The invention is described in terms of this operating system. However, it is understood that this implementation is illustrative of the preferred embodiment and in no way limits applicability of the invention to other operating systems. In the UNIX system, processes (p) operate on files (f). A given file may be associated at any given time with more than one process. Each such process-file relationship is identified by a file descriptor (d). Processes may spawn child processes, i.e., images of itself. Such child processes inherit certain characteristics of the parent process, such as a process security label. However, new file descriptors are generated for a child process. Thus, file descriptors uniquely identify every instance of a process-file relationship. Another attribute of the UNIX system is that media external to a system are also represented by files. Thus, terminals, disk drives, tape drives and the like are represented internally in the system as files. Thus, a write to a terminal is accomplished as a write to the internal file representing the terminal. A further attribute of the UNIX system is its file system which is divided into directories, which again are represented by files. Each directory can consist of ordinary files and other subdirectories, and so on.

Figure 1:
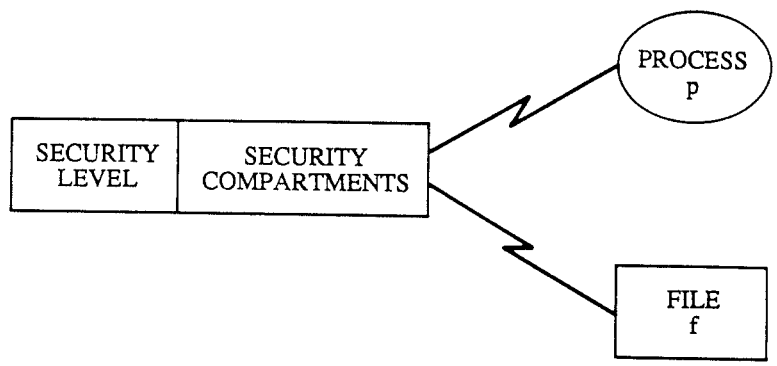
FIG. 1 shows the format of an illustrative security label in which one section defines a security level and a second section divides the security level into compartments to which the security level applies.

FIG. 1 introduces the notion of a security label as being associated with a process (p) or with a file (f). The illustrative security label in FIG. 1 is divided into two sections. The first SECURITY LEVEL section stores a numeric representation of an overall security level. This section might consist of three bits and be binary encoded to represent the customary military document classification levels unclassified, confidential, secret and top secret. The second section of FIG. 1, SECURITY COMPARTMENTS, further partition the SECURITY LEVEL. These bits might, for example, represent individual countries to which the security level applies. For example, the first two bits of SECURITY COMPARTMENTS might represent countries A and B, respectively. With the use of dynamic security labels, as files are read and written within the system, the labels associated with the files and with the processes performing the read and write operations are raised as necessary. On a read operation, a process label is raised to dominate the label of a file being read. On a write operation, a file label is raised to dominate the label of a process performing the write. However, in accordance with one aspect of the invention, the security labels associated with external media such as terminals, disk drives, tape drives and the like are frozen and cannot be altered, except by mechanisms having no relationship to the present invention. Thus, an attempt to write to a file representing an external medium having a security label that does not dominate the security label of the writing process is denied.

As one example of the use of dynamic labels, assume that a process is executing which has an initial security label 011 00. . . (secret security level with no clearance for countries A and B). Assume further that the process creates a new file NEWFILE. The new file initially may be labeled 000 00. . . by default. If the process attempts to write the name of the file into a directory, the security label of the directory is raised, if necessary, to at least that of the process. Now assume that the process reads another file OLDFILE, which say is labeled confidential for country A (001 10. . . ). In this case, the process label is raised to the logical union of the labels of the process and the file OLDFILE [(011 00. . .) UNION (001 10. . . )=(011 10. . . ). Finally, assume that the process attempts to write OLDFILE to a file associated with an output terminal. If the security label of the file associated with the terminal does not dominate that of OLDFILE, the write is denied.? Thus, security is maintained. The security labels of files and processes are raised as necessary for internal operations of the system. At a point when external access is attempted, however, access is denied unless the external access point has the proper authorization.

Figure 2:
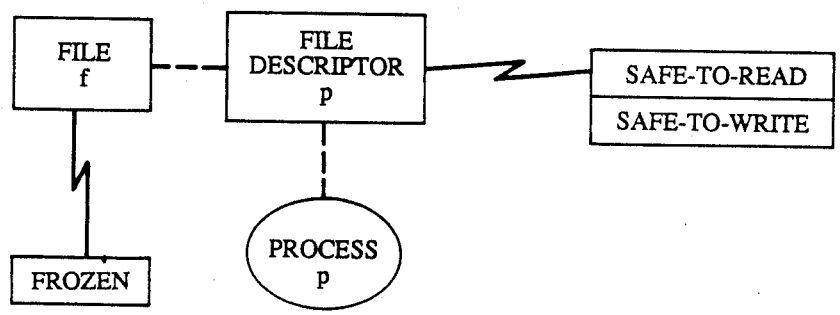
FIG. 2 illustrates the relationship between files, processes, file descriptors and safe-to-read/write bits, which are used to reduce the label verification overhead in an illustrative system used to explain the invention.

In the UNIX operating system, each file (f) that is opened by a process (p) is identified by a unique file descriptor (d). If two separate processes open the same file, each process-file pair is similarly identified by a different file descriptor, even though both processes are using the same file. FIG. 2 illustrates this process-file arrangement. In this FIG., a file (f) and a process (p) are joined by dotted lines to a file descriptor (d). When the process refers to the file, it does so through the operating system by means of the file descriptor. In accordance with the invention, two other indicators are associated with a file descriptor, a SAFE-TO-READ bit and a SAFE-TO-WRITE bit. These bits are shown in FIG. 2 as attached to the file descriptor by means of a solid line. The SAFE bits allow use of the dynamic label security method with acceptable system overhead, as described below. In accordance with the invention, also associated with each file is an indicator FROZEN, as shown in FIG. 2. The state of this indicator identifies whether or not the security label of the file may be raised at read and write time. The use of this file attribute is discussed further below in connection with attempted writes of data to media, such as terminals, that are external to the system.

Figure 3:
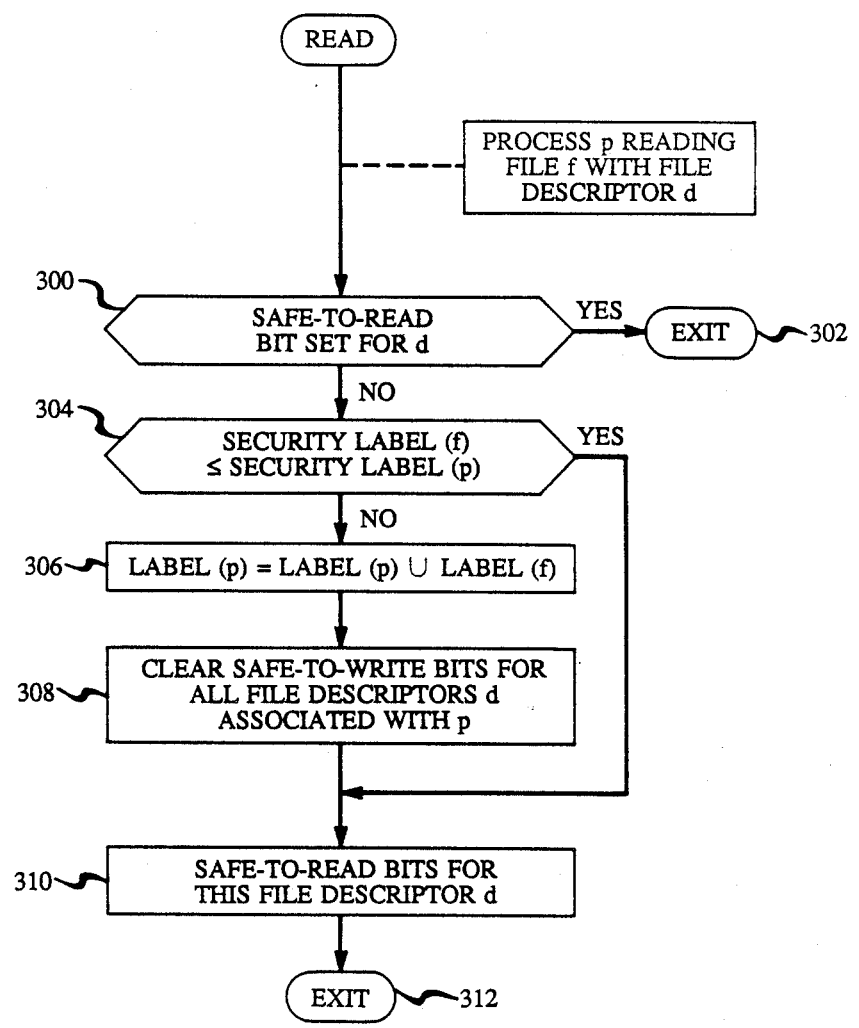
FIG. 3 shows an illustrative flowchart of the verification process for READ operations.
Figure 4:
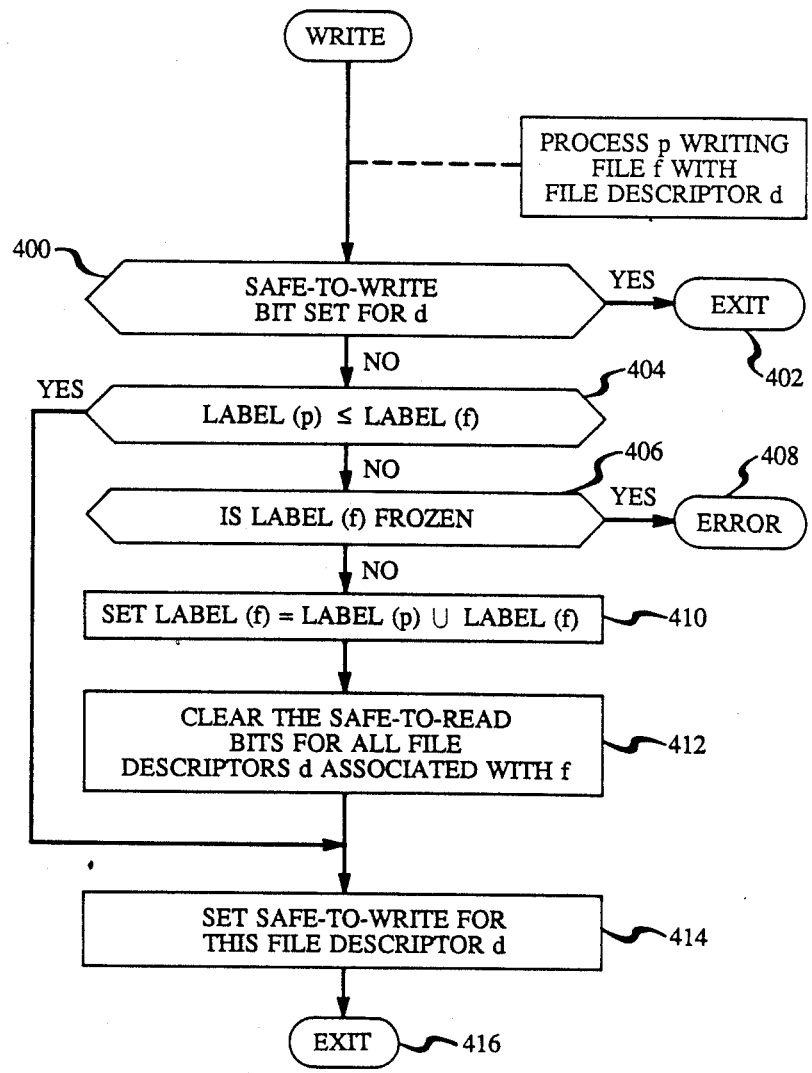
FIG. 4 shows an illustrative flowchart of the verification process for WRITE operations.

FIG. 3 and FIG. 4 show illustrative flowcharts of algorithms that are executed by the operating system each time a read or a write operation, respectively, is requested by a process. In FIG. 3, when a read operation is requested by a process, step 300 interrogates the SAFE-TO-READ bit associated with the file descriptor in question. If the SAFE-TO-READ bit is set, this means that the security labels for this process and file have been verified on an earlier read operation and the labels raised, if necessary. The safe state of the bit implies that no further system operation has taken place since that time to invalidate the earlier verification. Thus, if the SAFE-TO-READ bit is set, the algorithm merely exits at 302 and other portions of the operating system, not shown, perform the read operation.

If the SAFE-TO-READ bit is not set at step 300, then the process and file security labels are verified. Step 304 determines if the label of the file in question is dominated by the label of the process requesting a read. If so, a read of the file by the process is permitted without any further ado. In this case, the SAFE-TO-READ bit is set at step 310 and exit is made at 312 to perform the read operation.

At step 304, if the security label of the process does not dominate that of the file, then step 306 raises the label of the process by an appropriate amount. In this illustrative embodiment, raising of the process label is performed by logically ORing the present process label with the present file label. Next, at step 308, the operating system searches for and determines all file descriptors (d) that are associated with the present process (p). Step 308 then clears all the SAFE-TO-WRITE bits associated with the found file descriptors. This is necessary since the raising of the security label of the process has rendered future write operations by this process unsafe without reverification. After these operations have been performed, step 310 set the SAFE-TO-READ bit for this particular file descriptor and exit is made at 312.

In FIG. 4, when a write operation is requested by a process, step 400 interrogates the SAFE-TO-WRITE bit associated with the file descriptor in question. If the SAFE-TO-WRITE bit is set, this means that the security labels for this process and file have been verified on an earlier write operation and the labels raised, if necessary. The safe state of the bit implies that no further system operation has taken place since that time to invalidate the earlier verification. Thus, if the SAFE-TO-WRITE bit is set, the algorithm merely exits at 402 and other portions of the operating system, not shown, perform the write operation.

If the SAFE-TO-WRITE bit is not set at step 400, then the process and file security labels are verified. Step 404 determines if the label of the file in question dominates the label of the process requesting a write. If so, a write of the file by the process is permitted without any further ado. In this case, the SAFE-TO-WRITE bit is set at step 414 and exit is made at 416 to perform the write operation.

Recall that write operations are subject to a special consideration, namely, that writes to an external medium are not permitted by merely raising the security label of the file associated with the medium. Rather, the security labels of such external media are frozen at their assigned states. Therefore, at step 404, if the security label of the file does not dominate that of the process, then step 406 determines if the file security label is frozen. If the label is frozen, the write operation is denied by performing an error return to the operating system at 408. If the file security label is not frozen, step 410 raises the label of the file by an appropriate amount. In this illustrative embodiment, raising of the process label is performed by logically ORing the present process label with the present file label. Next, at step 412, the operating system searches for and determines all file descriptors (d) that are associated with the present file (f). Step 412 then clears all the SAFE-TO-READ bits associated with the found file descriptors. Clearing of the SAFE-TO-READ bits is necessary since the raising of the security label of the file has rendered all future read operations of this file unsafe without reverification. After these operations have been performed, step 414 sets the SAFE-TO-WRITE bit for this particular file descriptor and exit is made at 416 to perform the instant write operation.

It is to be understood that the above described arrangements are merely illustrative of the application of principles of the invention and that other arrangements may be devised by workers skilled in the art without departing from the spirit and scope of the invention.

We claim:

1. A method of administering secure access to files of a computer system in which at least two different security levels are used to limit access to files and processes, comprising:
    (a) associating a first security label defining one of said security levels with a file,
    (b) associating a second security label defining one of said security levels with a process,
    (c) comparing the first security label to the second security label in response to an attempt by the process to write the file,
    (d) dynamically raising the security level of the file if the security level of the file does not dominate the security level of the process, characterized by,
    (e) setting an indicator associated with this process and with this file to a first state representing that the process may subsequently write the file before performing step (c),
    (f) setting an indicator associated with every other process that is presently capable of processing this file to a second state representing that the file may not be read by other processes if the security label is changed in step (d), and
    (g) omitting steps (c) through (f) on subsequent write attempts of the file by a process when the indicator associated with the process-file pair is set to the first state.

2. The method of claim 1 further comprising the step of associating with the security labels of predefined files a status unalterable by the method, whereby the security label of such files cannot be altered in response to an attempted write operation.

3. The method of claim 2 wherein an attempt to write a file having said unalterable status and in which the security level of the process dominates that of the file is denied.

4. The method of claim 3 wherein such predefined files represent media external to the system.

5. The method of claim 4 wherein such media comprise access ports to the system.

6. The method of claim 5 wherein such access ports to the system comprise terminals, disk drives and tape drives.

7. The method of claim 1 wherein the indicator for a file-process pair further comprises a SAFE-TO-READ indicator and a SAFE-TO-WRITE indicator.

8. A method of administering secure access to files of a computer system in which at least two different security levels are used to limit access to files and processes, comprising:
   (a) associating a first security label defining one of said security levels with a file,
   (b) associating a second security label defining one of said security levels with a process,
   (c) comparing the first security label to the second security label in response to an attempt by the process to read the file,
   (d) dynamically raising the security level of the process if the security level of the process does not dominate the security level of the file, characterized by
   (e) setting an indicator associated with this process and with this file to a first state representing that the file may subsequently be read by the process before performing step (c),
   (f) setting an indicator associated with every other process that is presently capable of accessing this file to a second state representing that the file may not be written by the other processes if the security label is changed in step (d), and
   (g) omitting steps (c) through (f) on subsequent read attempts of the file by a process when the indicator associated with the process-file pair is set to the first state.

9. The method of claim 8 further comprising the step of associating with the security level of predefined files a status unalterable by the method, whereby the security label of such files cannot be altered in response to an attempted read operation.

10. A method of administering secure access to files of a computer system in which at least two different security levels are used to limit access to files and processes, comprising:
   (a) associating a first security label defining one of said levels with a file,
   (b) associating a second security label defining one of said levels with a process adapted to write the file,
   (c) associating a third security label defining one of said levels with a process adapted to read the file,
   (d) responsive to an attempt by the write process to write the file, comparing the first and second security labels,
   (e) if the first security label identifies a more rigorous security level than the second security label, setting a first indicator, jointly associated with the file and the write process, to a state which indicates the write process may subsequently write the file,
   (f) if the first security label does not identify a more rigorous security level than the second security label, changing the first security label so that it identifies a security level at least as rigorous as the second security label; setting said first indicator, jointly associated with the file and the write process, to a state which indicates the write process may subsequently write the file; and setting a second indicator, jointly associated with the file and the read process, to a state which indicates that the read process may not subsequently read the file without comparing the first and third security labels respectively associated with the file and the read process,
   (g) omitting steps (d) through (g) on subsequent attempts by the write process to write the file when said first indicator is set to the state which indicates that the write process may subsequently write the file.

11. A method of administering secure access to files of a computer system in which at least two different security levels are used to limit access to files and processes, comprising:
   (a) associating a first security label defining one of said levels with a file,
   (b) associating a second security label defining one of said levels with a process adapted to write the file,
   (c) associating a third security label defining one of said levels with a process adapted to read the file,
   (d) responsive to an attempt by the read process to read the file, comparing the first and third security labels,
   (e) if the third security label identifies a more rigorous security level than the first security label, setting a first indicator, jointly associated with the file and the read process, to a state which indicates the read process may subsequently read the file,
   (f) if the third security label does not identify a more rigorous security level than the first security label, changing the third security label so that it identifies a security level at least as rigorous as the first security label; setting said first indicator, jointly associated with the file and the read process, to a state which indicates the read process may subsequently read the file; and setting a second indicator, jointly associated with the file and the write process, to a state which indicates that the write process may not subsequently write the file without comparing the first and second security labels respectively associated with the file and the write process,
   (g) omitting steps (d) through (g) on subsequent attempts by the read process to read the file when said first indicator is set to the state which indicates that the read process may subsequently read the file.

12. The method of administering secure access to files in a computer system in which at least two different security levels are used to limit access to files and processes, comprising:
   (a) associating a security level with a file,
   (b) associating a security level with a process,
   (c) initially setting a security indicator jointly associated with the file and the process to a first or a second state,
   (d) when the process attempts to read or write the file, determining the state of said security indicator,
   (e) allowing the attempt to succeed if said indicator is in the first state,
   (f) if said indicator is in the second state, comparing the security level of the process with the security level of the file,
   (g) allowing the attempt to succeed where the security levels of the process and the file meet predetermined criteria, and setting said indicator to the first state,
   (h) where the security levels do not meet the predefined criteria, allowing the attempt to succeed, setting said indicator to the first state, and setting other security indicators jointly associated with the file and other of said processes to the second state.

13. The method of claim 12 further comprising the step of assigning the file a critical status indication and inhibiting the completion of the attempt in step (h) responsive thereto.

* * * * *